US010671388B1

(12) United States Patent
Preusser et al.

(10) Patent No.: US 10,671,388 B1
(45) Date of Patent: Jun. 2, 2020

(54) VECTORIZATION OF WIDE INTEGER DATA PATHS FOR PARALLEL OPERATIONS WITH SIDE-BAND LOGIC MONITORING THE NUMERIC OVERFLOW BETWEEN VECTOR LANES

(71) Applicant: Xilinx, Inc., San Jose, CA (US)

(72) Inventors: Thomas B. Preusser, Dresden (DE); Thomas A. Branca, Los Gatos, CA (US)

(73) Assignee: XILINX, INC., San Jose, CA (US)

( * ) Notice: Subject to any disclaimer, the term of this patent is extended or adjusted under 35 U.S.C. 154(b) by 39 days.

(21) Appl. No.: 16/200,313

(22) Filed: Nov. 26, 2018

(51) Int. Cl.
*G06F 7/499* (2006.01)
*G06F 9/30* (2018.01)

(52) U.S. Cl.
CPC ........ *G06F 9/30036* (2013.01); *G06F 7/4991* (2013.01); *G06F 9/30014* (2013.01)

(58) Field of Classification Search
CPC . G06F 9/30036; G06F 7/4991; G06F 9/30014
USPC .......................................................... 708/498
See application file for complete search history.

(56) References Cited

U.S. PATENT DOCUMENTS

2018/0307494 A1* 10/2018 Ould-Ahmed-Vall ...................... G06F 9/30036

OTHER PUBLICATIONS

Fu, Yao et al., "Deep Learning with INT8 Optimization on Xilinx Devices," WP486 (v1.0.1), Apr. 24, 2017, pp. 1-11, Xilinx, Inc., San Jose, California, USA.

Vestias, Mario et al., "Parallel Dot Products for Deep Learning on FPGA," Proc. of the 27th International Conference on Field Programmable Logic and Applications (FPL 2017), Sep. 4, 2017, pp. 1-4, IEEE, Piscataway, New Jersey, USA.

Specification and drawings for U.S. Appl. No. 16/200,336, filed Nov. 26, 2018, Preusser et al.

* cited by examiner

*Primary Examiner* — Tan V Mai
(74) *Attorney, Agent, or Firm* — Patterson + Sheridan, LLP

(57) ABSTRACT

The embodiments herein describe handling overflow that occurs between different portions of a multi-result vector storing results from performing multiple operations in parallel. Rather than using guard bits to separate the various results in the multi-result vector, the embodiments herein describe using overflow monitors to detect and account for overflow that can occur in a multi-result vector that is passed in a chain of arithmetic units. Side band logic evaluates the LSBs in the operands for the reduced-precision operations to generate an expected value of performing the operation and compares the expected value to an actual value of the corresponding bits in the multi-result vector. If the expected and actual values match, then there was no overflow. However, if the values do not match, the side band logic updates the overflow value so that this overflow can be corrected once the final multi-result vector has been calculated.

20 Claims, 6 Drawing Sheets

CONFIG / CLOCK DISTRIBUTION 51
Transceiver 37
PCIe 40
CLBs 33
BRAMs 34
IOBs 36
CLBs 33
BRAMs 34
DSPs 35
CLBs 33
Other 39
I/O 41
CONFIG / CLOCKS 42
I/O 41
Other 39
CLBs 2
BRAMs 34
DSPs 35
CLBs 33
IOBs 36
CLBs 33
BRAMs 34
CLBs 33
Transceivers 37
ADC 38
48
INT 43
49
33
CLE 44
50
600
49
34 or 35
INT 43
BRL 45
or
DSPL 46
48
50
INT 43
49
48
36
IOL 47
IOL 47
50

VECTORIZATION OF WIDE INTEGER DATA PATHS FOR PARALLEL OPERATIONS WITH SIDE-BAND LOGIC MONITORING THE NUMERIC OVERFLOW BETWEEN VECTOR LANES

TECHNICAL FIELD

Examples of the present disclosure generally relate to performing multiple reduced precision arithmetic operations in parallel using more precise arithmetic units.

BACKGROUND

Programmable integrated circuits (e.g., programmable logic devices, field programmable gate arrays (FPGAs), etc.) and non-programmable integrated circuits can include arithmetic units (e.g., multipliers, adders, digital signal processors, accumulators, and the like) which are designed to receive multiple input operands and generate a resulting value—e.g., performing an add, subtract, multiple, or multiply accumulator (MAC) operation. The arithmetic units generate an output with a fixed number of bits (e.g., a 48 bit output) which defines the precision of the unit. However, rather than performing a single operation, the arithmetic units can be used to perform multiple reduced precision arithmetic operations in parallel. For example, rather than performing a single operation using 16 bit operands, the unit can perform two operations using 8 bit operands. However, the results of the two 8-bit operations are still stored within the same 48 bit output vector of the arithmetic unit. For example, a first sub-portion of the output vector is allotted to the first 8-bit operation while a second sub-portion of the output vector is allotted to the second 8-bit operation. However, in a chain of arithmetic units where the results of one arithmetic unit is used as an input to the next unit in the chain, the results may begin to overflow. For example, the first sub-portion of the output vectors may not be sufficient to store the results of the operation, in which case, the most significant bits of the first operation may interfere with the least significant bits of the second operation in the output vector.

To prevent this overflow, guard bits can be allocated in the output vector which provides a buffer between the portions of the vector assigned to the two operations. When in the chain the results of the first operation would overflow, this is absorbed by the guard bits. As a result, the guard bits provide a limited buffer which permits the first operation to grow without affecting the bits in the output vector assigned to the second operation.

SUMMARY

Techniques for performing multiple reduced-precision operations in parallel are described. One example is an integrated circuit that includes a chain of arithmetic units, where each arithmetic unit is configured to selectively perform either a single large operation or multiple reduced-precision operations in parallel, where the arithmetic units are configured to, when performing the multiple reduced-precision operations in parallel, generate multi-result vectors. The integrated circuit also includes side-band logic configured to generate expected values associated with performing the multiple reduced-precision operations in a first arithmetic unit in the chain of arithmetic units based on operands inputted to the first arithmetic unit and a first multi-result vector previously generated by a second arithmetic unit upstream from the first arithmetic unit in the chain of arithmetic units, receive actual bit values of a second multi-result vector generated by the first arithmetic unit, and update an overflow value to indicate a first result in the second multi-result vector overflowed into a second result in the second multi-result vector when at least one of the expected values fails to match a corresponding one of the actual bit values. The integrated circuit also includes an overflow corrector configured to correct the overflow between the first and second results based on the overflow value after a last arithmetic unit in the chain in the arithmetic units generates a final multi-result vector.

One example described herein is circuit that includes a chain of arithmetic units, where each arithmetic unit is configured to perform multiple reduced-precision operations in parallel, where the arithmetic units are configured to, when performing the multiple reduced-precision operations in parallel, generate multi-result vectors. The circuit also includes side-band logic configured to generate expected values associated with performing the multiple reduced-precision operations in a first arithmetic unit in the chain of arithmetic units based on operands inputted to the first arithmetic unit and a first multi-result vector previously generated by a second arithmetic unit upstream from the first arithmetic unit in the chain of arithmetic units, receive actual bit values of a second multi-result vector generated by the first arithmetic unit, and update an overflow value to indicate a first result in the second multi-result vector overflowed into a second result in the second multi-result vector when at least one of the expected values fails to match a corresponding one of the actual bit values. The circuit includes an overflow corrector configured to correct the overflow between the first and second results based on the overflow value after a last arithmetic unit in the chain in the arithmetic units generates a final multi-result vector.

One example described herein is a method that includes performing multiple reduced-precision operations in parallel using a first arithmetic unit in a chain of arithmetic units to generate a first multi-result vector where the arithmetic units are capable of performing both the multiple reduced-precision operations and a single large operation, performing the multiple reduced-precision operations in parallel using a second arithmetic unit in the chain of arithmetic units to generate a second multi-result vector, wherein the second arithmetic unit is downstream from the first arithmetic unit, generating expected values associated with performing the multiple reduced-precision operations in the second arithmetic unit based on operands inputted to the second arithmetic unit and the first multi-result vector, receiving actual bit values of the second multi-result vector generated by the second arithmetic unit, and updating an overflow value to indicate a first result in the second multi-result vector overflowed into a second result in the second multi-result vector when at least one of the expected values fails to match a corresponding one of the actual bit values.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
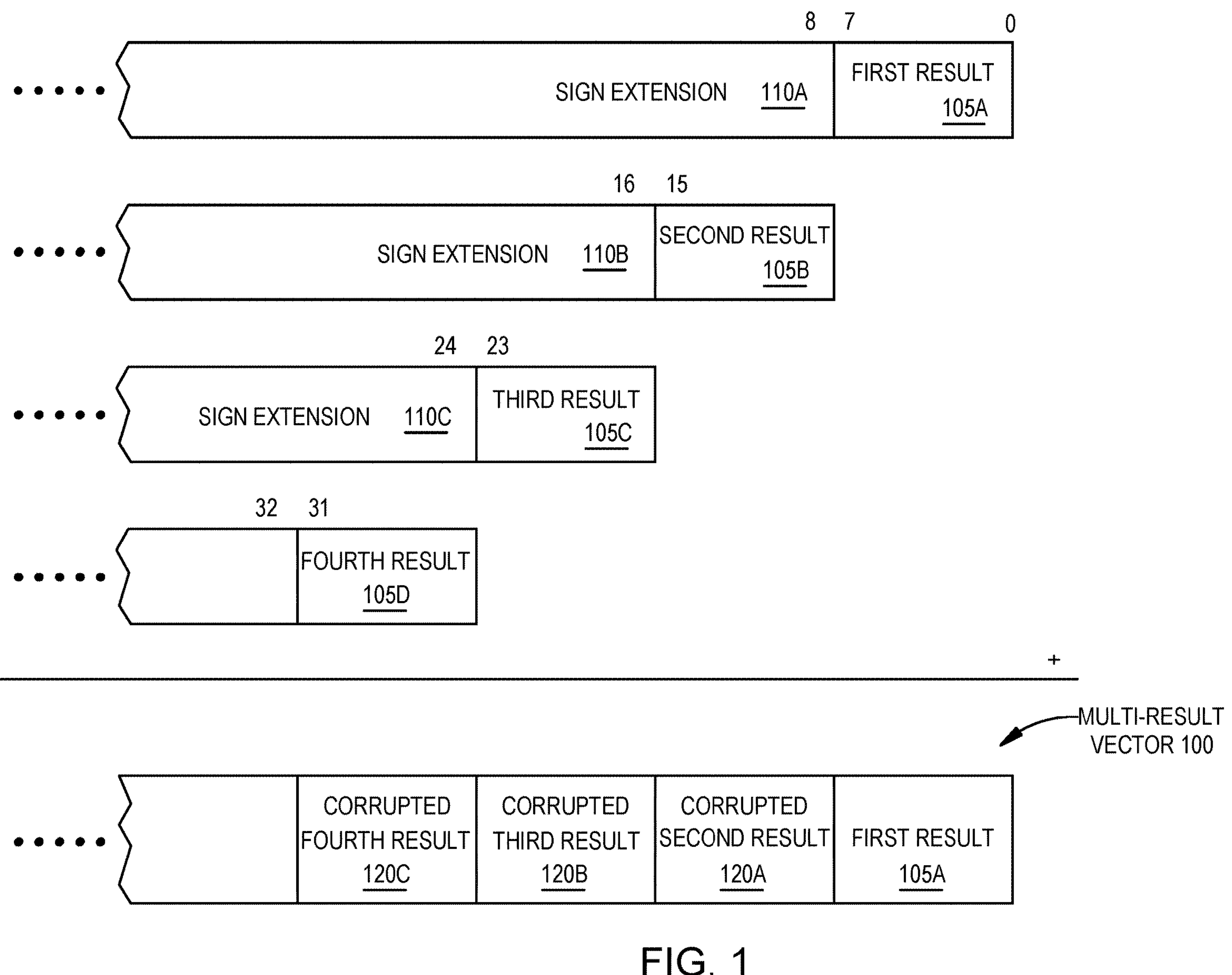
FIG. 1 illustrates combining results from performing parallel reduced-precision arithmetic operations into a multi-result vector, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The embodiments herein describe handling overflow that occurs between different portions of a multi-result vector storing results from performing multiple operations in parallel. As mentioned above, guard bits can be disposed between different sub-portions in a multi-result vector which are used to store results from performing multiple reduced-precision operations. However, the guard bits take up bits which could otherwise be used to store results of performing the operations. For example, when using a 16-bit arithmetic unit to perform two parallel 8-bit operations, there may be sufficient room for guard bits in the multi-result vector. However, when using the 16-bit arithmetic unit to perform four parallel 4-bit operations or eight parallel 2-bit operations, using guard bits can have a larger negative effect on the achievable parallelism, e.g., the operational density. As such, rather than using guard bits to separate the various results in the multi-result vector, the embodiments herein describe using overflow monitors to detect and account for overflow that can occur in a multi-result vector that is passed in a chain of arithmetic units.

Many different types of compute operations can require large chains of arithmetic units. For example, different types of neural networks or machine learning models can use a chain that includes hundreds, or thousands, of arithmetic units. In some situations, the neural network can perform reduced-precision operations using the more precise arithmetic units (e.g., perform four 4-bit operations rather than one 16-bit operation at each unit). The embodiments herein describe techniques for detecting overflow at the stages in the chain using side band logic and then adding or subtracting an overflow value from multi-result vector generated by the last stage (e.g., the last arithmetic unit) in the chain. In this manner, any overflow between the various results of the parallel reduced-precision operations in the multi-result vector can then be corrected at the last stage in the chain.

In one embodiment, the side band logic evaluates the least-significant bits (LSBs) in the operands for the reduced-precision operations to generate an expected value of performing the operation. The side band logic can then compare the expected value to an actual value of the corresponding bits in the multi-result vector. If the expected and actual values match, then there was no overflow. However, if the values do not match, the side band logic updates the overflow value so that this overflow can be corrected once the final multi-result vector has been calculated. In this manner, the chain can have any desired length. Moreover, the chain is not slowed down by storing and updating the overflow value in the side band logic. Put differently, in one embodiment, the side band logic can monitor and update the overflow value without having to stop, pause, or terminate the chain of arithmetic units.

FIG. 1 illustrates combining results from performing parallel reduced-precision arithmetic operations into a multi-result vector 100, according to an example. The multi-result vector 100 illustrates the output vector of an arithmetic unit. The multi-result vector 100 can include any number of bits which are sub-divided to store the result 105A of a first reduced-precision operation, a result 105B of a second reduced-precision operation, a result 105C of a third reduced-precision operation, and a result 105D of a fourth reduced-precision operation. For example, the arithmetic unit may be architected (or designed) to perform a more precise operation which is typically stored in the bits of the vector 100. However, the architecture of the arithmetic unit is also able to perform, in parallel, multiple reduced-precision operation.

In FIG. 1, the results 105 are signed integers where, when performing the operations, the signs are extended. For example, the first result 105A has sign extension bits 110A, the second result 105B has sign extension bits 110B, the third result has sign extension bits 110B, and so forth depending on the length of the vector 100 and the number of reduced-precision operations being performed.

To calculate the multi-result vector 100 in FIG. 1, the results 105 and their corresponding sign extension bits 110 are summed which is a choice of lane encoding. This example may be preferred for the multiply-accumulate operation as it remains intact through both the multiplication operation and the accumulation operation no matter how big or small the lane separation might be. The sign bits, in the context of the products or other primary computational inputs, mark an intuitive and economically sensible superposition of the lanes. However, already when looking at the accumulated (partial) results, the superposition suffers more mutual interference comprising all the inflicted cross-lane overflows. This can be interpreted as a lane overlap beyond the sign bit.

As illustrated, the sign extension bits 110A for the first result 105A are added to the second result 105B, the sign extension bits 110A and 110B for the first and second results 105A and 105B are added to the third results 105C, and the sign extension bits 110A, 110B, and 110C for the first, second and third results 105A, 105B, and 105C are added to the fourth results 105D. Thus, if any of the sign extension bits 110A, 110B, and 110C include non-zero values, these values can affect the results stored in the multi-result vector 100. For example, if the sign of the integer of the first result 105A is a zero (e.g., the first result is a positive number), then the sign extension bits 110A (which are a series of zeros) do not affect the second, third, or fourth results 105B, 105C, and 105D. However, if the sign extension bits 110A of the integer of the first result 105A are ones (e.g., the first result is a negative number), then performing the summation in FIG. 1 results in the sign extension bits 110A corrupting the second, third, and fourth results. The same analysis applies to the sign extension bits 110B and 110C for the second and third results 105B and 105C. If these bits are non-zero, they can affect the third and fourth results stored in the multi result vector 100. Because of the potential corruption that can result from the sign extension bits 110, the multi-result vector 100 may store corrupted values of the second result 120A, the third result 120B, and the fourth result 120C.

The corruption that can result from the sign extension bits 110 is one exemplary form of overflow between the results 105 of the reduced-precision operations that are stored in the multi-result vector 100. For example, because the bits 0-7 may be insufficient to store the value of the first result 105A, the sign of the first result overflows into the LSB of the second results 105B. Similarly, because the bits 9-15 may be insufficient to store the value of the second result 105B, the sign of the second result overflows into the LSB of the third results 105C, and so forth. If the sign is represented by a zero, then the overflow does not have a negative impact. However, if the sign bit (or bits) is non-zero, the overflow does have a negative impact when the results are summed and stored in the multi-result vector 100.

The likelihood of an overflow increases in a chain of arithmetic units. That is, for a single arithmetic unit, the number of bits in the vector 100 assigned to each result can be sufficiently large to prevent an overflow. However, in a chain where the multi-result vector 100 outputted by an upstream arithmetic unit is combined with results generated by a downstream arithmetic unit, the results may eventually overflow (if the value of the operands cannot be controlled). Thus, while the portion of the vector 100 assigned to the first result 105A may not be corrupted, the remaining portions may store corrupted results 120.

The bit assignment illustrated in the multi-result vector 100 is just one example of sub-dividing the vector 100. In other examples, when performing 2-bit reduced precision operations, four or more bits may be assigned to each result in the multi-result vector 100. Conversely, if performing 8-bit operations, 16 or more bits may be assigned to each result in the vector 100. Further, the vector 100 may have a different number of total bits depending on the architecture of the arithmetic unit—e.g., 32, 48, 64, etc.

Figure 2:
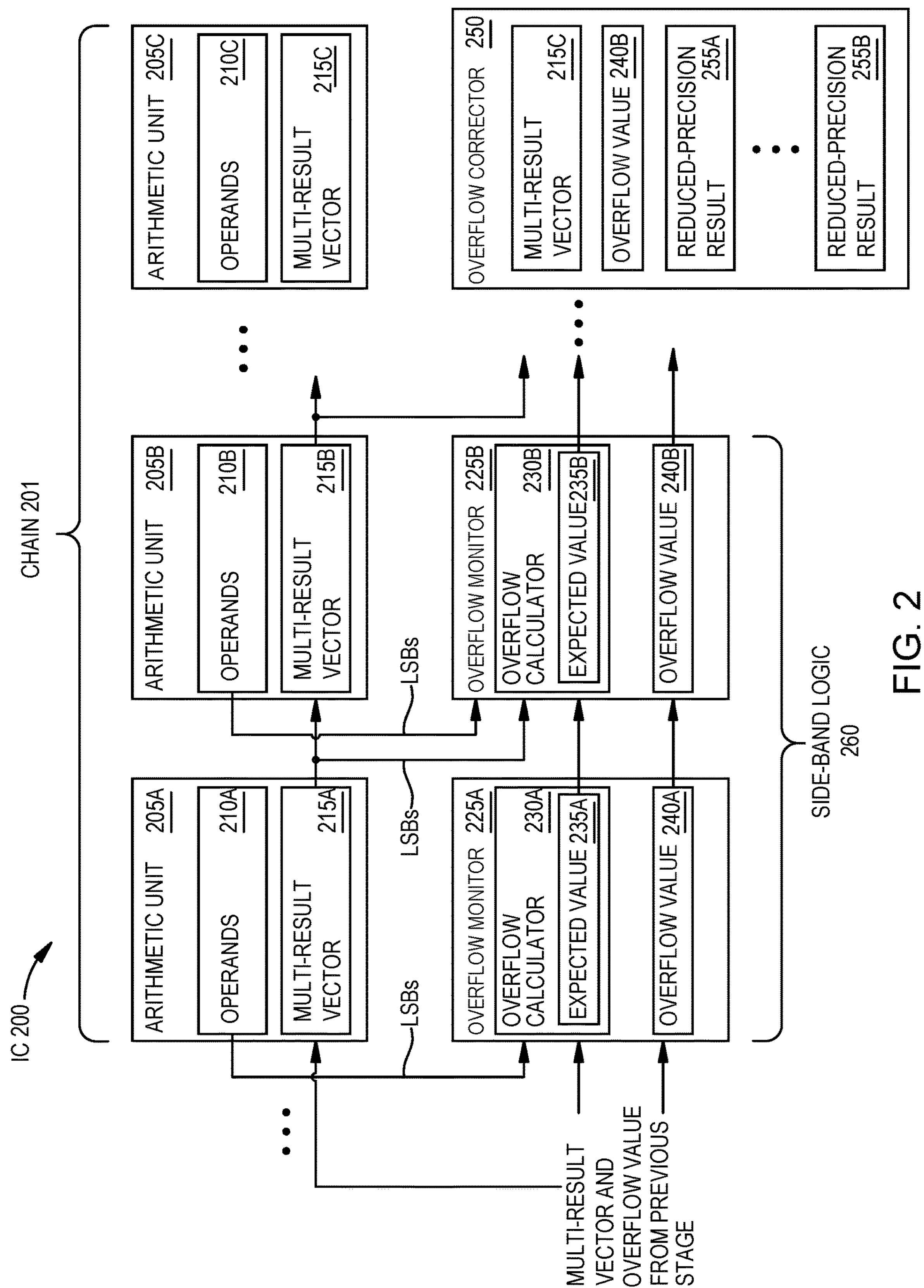
FIG. 2 is an integrated circuit that includes a chain of arithmetic units which perform parallel reduced-precision arithmetic operations, according to an example.

FIG. 2 is an integrated circuit (IC) 200 that includes a chain 201 of arithmetic units 205 which perform parallel reduced-precision arithmetic operations, according to an example. The arithmetic units 205 may perform different operations. For example, the units 205 may be multipliers, adders, subtractors, accumulators, and the like. In one embodiment, the arithmetic units 205 are digital signal processors (DSP) which perform a multiply accumulate (MAC) operation. In one embodiment, the chain 201 of arithmetic units 205 forms part of a neural network or a machine learning model. The arithmetic units 205 may contribute to a convolution, matrix multiplication or another operation as defined in the neural network.

Each arithmetic units 205 receives operands 210 which are then processed (e.g., added, subtracted, multiplied, etc.) to generate a multi-result vector 215. For example, if the arithmetic units 205 perform four reduced-precision operations using the operands 210, the multi-result vector 215 may be formatted similar to the vector 100A illustrated in FIG. 1 where four sub-portions of the vector 215 are allocated to store the results.

The unit 205A performs multiple reduced-precision MAC operations in parallel using the operands 210A which are then stored in the multi-result vector 215A. As shown, this vector 215A is then passed to the arithmetic unit 205B. In turn, the unit 205B uses its operands 210B to perform multiple reduced-precision MAC operations in parallel which are then combined with the multi-result vector 215A received from the unit 205A to generate a multi-result vector 215B for the arithmetic unit 205B.

The arithmetic unit 205 then transmits the multi-result vector 215B down the chain 201. Eventually, the last unit in the chain 201 is reached (e.g., the arithmetic unit 205C) where it uses the multi-result vector from the previous unit and its operands 210C to generate a final multi-result vector 215C.

To detect overflow between the results in the multi-result vectors 215, the IC 200 includes overflow monitors 225 for monitoring and updating an overflow value 240. In this example, each arithmetic unit 205 has its own overflow monitor 225, except for the last arithmetic unit 205C in the chain 201. However, this is not a requirement. In other examples, there may be fewer overflow monitors 225 than arithmetic units 205. For example, there may not be an overflow monitor 225 for the first or second arithmetic units 205 in the chain, or there may be an overflow monitor 225 for every other arithmetic unit 205.

In the stages illustrated in FIG. 2, the LSBs for the operands 210 are transmitted from the arithmetic units 205 to the overflow monitors 225. The overflow monitors 225 include an overflow calculator 230 which receives the LSBs of the operands 210A, as well as corresponding bits from the multi-result vector 215 generated by the previous stage, and determines an expected value 235 of performing the operation on those bits. Put differently, the overflow calculator 230 performs the same operation on the LSBs of the operands 210 and the corresponding bits in the multi-result vector 215 received from the previous stage that the arithmetic unit 205 performs; however, there is no threat of suffering an overflow. As mentioned above when discussing FIG. 1, the sign bit (or bits) of the results can cause an overflow which, at a minimum, can affect the LSBs of the second, third, and fourth results 105B, 105C, and 105D. Because the overflow calculator 230 only performs an operation on the LSBs of the operands 210 and a few bits in the previously calculated multi-result vector 215, the operation is less complex than the operation performed in the arithmetic unit 205A. Thus, overflow calculator 230 can be performed using slower circuitry (e.g., programmable logic) and still execute as fast as the arithmetic units 205, but this is not a requirement.

Although the overflow monitor 225A is illustrated in FIG. 2 as containing an overflow value 240A, if the arithmetic unit 205A is in an earlier stage in the chain 201, the overflow monitor 225A may not include the overflow value 240. That is, it may be impossible for an overflow to occur in earlier stages.

The overflow monitor 225A forwards the expected value 235A as well as the overflow value 240A to the next overflow monitor—e.g., the overflow monitor 225B. In addition to receiving these values, the overflow monitor 225B also receives LSBs from the multi-result vector 215A which represent the actual value that was calculated by the arithmetic units.

The overflow monitor 225B compares the actual value of the LSBs of the multi-result vector 215A received from the arithmetic unit 205A to the expected value 235A received from the overflow monitor 225A. If these values match, this indicates there was no overflow between the results stored in the multi-result vector 215A. However, if the expected value 235A does not match the corresponding actual values in the multi-result vector 215A, this indicates there was an overflow. The overflow monitor 225B can store an indication of this overflow in the overflow value 240B. In this manner, the overflow monitor 225B determines whether there was an overflow in the multi-result vector 215A calculated at the previous stage in the chain 201 (e.g., the arithmetic unit 205A).

Like the overflow monitor 225A, the overflow monitor 225B also includes its own overflow calculator 230B which receives the LSBs of the operands 210B and the corresponding bits of the multi-result vector 215A and calculates an expected value 235B when performing the operation in the arithmetic unit 205B. The expected value 235B as well as the updated overflow value 240B can be passed to the next overflow monitor 225 (if any). In this manner, the overflow monitors 225 can update and pass the overflow to the next overflow monitor which can store an indication of overflow that occurred in the previous stages (if any). The overflow value generated at the last overflow monitor 225 can be used to compensate for (or reverse) the effect of the overflow in all the stages in the chain 201. That is, the overflow value 240 is updated by the overflow monitors 225 as the multi-result vector 215 propagates through the chain 201. Moreover, because each overflow monitor 225 includes a memory element for storing the overflow value 240, the chain 201 can be pipelined so that each overflow monitor 225 stores a different overflow value 240. The arithmetic units 205 also include memory elements for storing the multi-result vector 215 so that the units 205 can store different vectors 215.

The IC 200 includes an overflow corrector 250 which stores the "total" or final multi-result vector 215C generated by the last arithmetic unit 205C in the chain 201 as well as the final overflow value 240B received from the last overflow monitor 225B in the chain 201. As described in more detail below, the overflow corrector 250 can use the data in the multi-result vector 215C and the overflow value 240B to generate multiple reduced-precision results 255. For example, if the arithmetic units 205 are each designed to perform a 16-bit MAC operation but instead perform two parallel 5-bit MAC operations, the overflow corrector 250 can generate two reduced-precision results 255—one for each of the 5-bit operations where the effect of any overflow between these results when stored in the multi-result vectors 215 has been removed. If the arithmetic units 205 are designed to perform a 16-bit operation but instead perform four parallel operations, the overflow corrector 250 can generate four reduced-precision results 255 (e.g., reduced precision results 255A-255D)—one for each of the operations where the effect of any overflow between these results when stored in the multi-result vectors 215 has been removed. By updating and storing the overflow values 240, the arithmetic units 205 can generate the multi-result vectors 215 without using guard bits thereby increasing the precision of the results 255.

In FIG. 2, the overflow monitors 225 are in side-band logic 260. That is, the overflow monitors 225 can be considered as side-band operations that execute in parallel with the arithmetic units 205 forming the chain 201. In some embodiment, the overflow monitors 225 may be considered as forming a secondary chain which executes in parallel with the chain 201. Further, the overflow corrector 250 may be part of the side-band logic 260.

In one embodiment, the side-band logic 260 includes programmable logic and/or a programmable network. That is, the overflow monitors 225, as well as the overflow corrector 250, can be formed from programmable logic (e.g., configurable logic blocks) rather than hardened circuitry—i.e., non-programmable circuitry. In this example, the IC 200 may be an FPGA or other programmable logic device. While the arithmetic units 205 can also be formed from programmable circuitry, in other embodiments, the arithmetic units 205 are hardened circuitry. For example, an FPGA may include both hardened and programmable circuitry. The arithmetic units 205 may be formed using hardened circuitry (which may improve their performance) while the overflow monitors 225 are formed using programmable logic in the side-band logic 260. Although the overflow monitors 225 are in programmable logic, which may be slower than using customized, hardened circuitry, the techniques described herein can operate the overflow monitors 225 at sufficient speeds so that the side-band logic 260 does not slow down or pause the chain 201. However, in another embodiment, both the arithmetic units 205 and the overflow monitors 225 may both be implemented using programmable logic or may both be implemented using hardened circuitry (in which case the IC 200 may be a non-programmable IC such as an ASIC).

Figure 3:
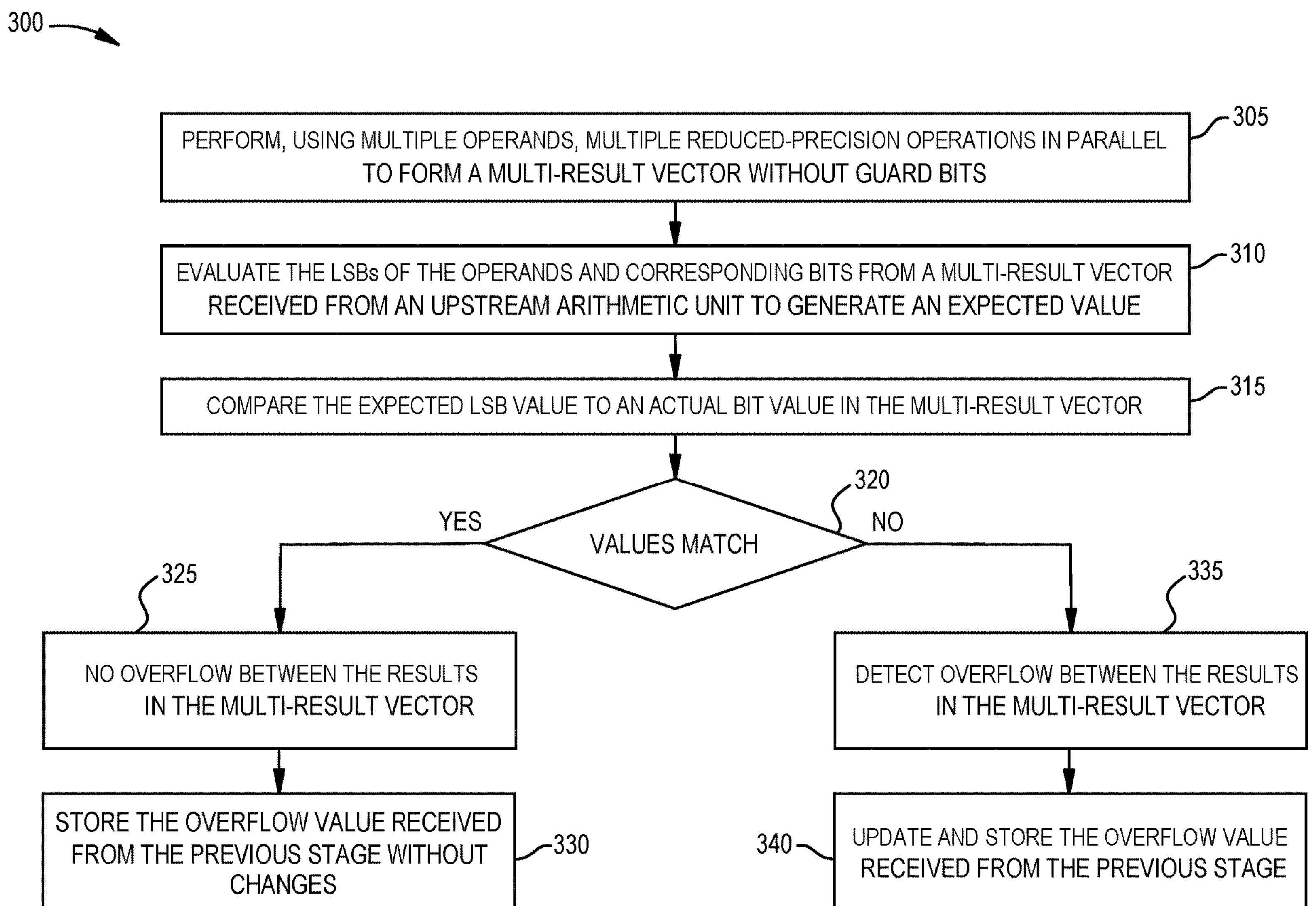
FIG. 3 is a flowchart for performing parallel reduced-precision arithmetic operations, according to an example.

FIG. 3 is a flowchart of a method 300 for performing parallel reduced-precision arithmetic operations, according to an example. At block 305, an arithmetic unit in a chain of hardened arithmetic units performs, using multiple operands, reduced-precision operations in parallel to form a multi-result vector that does not include guard bits. That is, the arithmetic unit is configured to perform a large integer operation but instead uses virtual vectorization to perform reduced-precision integer operations in parallel using its wide integer data path for performing the large integer operation. For example, instead of performing a 16-bit operation (e.g., the large integer operation), the arithmetic unit performs two parallel 8-bit operations or four parallel 4-bit operations using the wide data path that was designed to perform the 16-bit operation.

Further, the multi-result vector may not include guard bits or any other type of reserved bits between the results in the vector to store overflow that may occur between the sign bit (or the most-significant bit (MSB)) in one result in the vector and the LSB in an adjacent result in the vector. Instead, the method 300 permits the sign bits and MSBs of the results in the multi-result vector to affect the LSBs in the neighboring results. Nonetheless, the method 300 includes a technique using, e.g., the circuitry described in FIG. 2 to detect and track the overflow between the results and generate an overflow value which can be used at the end of a chain of arithmetic units to compensate for or remove the negative impact of the overflow.

At block 310, an overflow monitor (which may be in the same stage in the chain as the arithmetic unit performing block 305) evaluates the LSBs of the operands used to generate the multi-result vector and bits from a multi-result vector received from an upstream arithmetic unit to generate an expected value. Put differently, the overflow monitor determines what the value of performing the operation would be if there was no chance of an overflow. To do so, the overflow monitor uses the LSBs of the operands and corresponding bits in the multi-result vector outputted by the upstream arithmetic unit to generate the expected value. In this manner, the overflow monitors can use the expected values as a baseline to detect when an overflow event occurred.

While in one embodiment, the overflow monitors compares the actual LSB of a multi-result vector to an expected value, the embodiments are not limited to using LSBs. For example, comparing the actual LSB in a result vector against its expected true value can have exactly two results: match or mismatch. Thus, two overflow cases can be detected: overflow or no overflow. This is sufficient for some situations such as an unsigned accumulation where cross-lane carries are either zero or a one. However, in other situations, it may be preferred to detect additional types of overflow cases. For example, in signed accumulation, the system may handle three possible cross-lane overflows: −1, 0, 1. To detect and identify these three cases, more LSBs (e.g., two or more) are predicted for reference. Put differently, rather than comparing a single bit in the multi-result vector to an expected bit, the overflow monitors may compare multiple bits in the multi-result vector to multiple expected bits.

While generating multiple expected bits in the overflow monitors in the side-band logic also works for just arithmetic operations (rather than multiply-accumulate operations), when doing multiply-accumulate operations it enables a tight result lane packing that boosts the utilization of the valuable wide-precision multiplier and the lane overflow monitoring performed in the side-band logic only relies on easy-to-compute product bits (LSB0, LSB1, etc.) at the lane boundaries. Moreover, this approach can work with a hidden multiplication in a fused multiply-accumulate implementation with no access to the product that is accumulated. For example, the exemplary computations of product bits (P) frequently used for the prediction of the true unaffected result can be derived from the input vectors (A and B). For example, the product bit P_0 can be found from performing an AND operation on A_0 and B_0 while product bit P_1 can be found from (A_1 AND B_0) XOR (A_0 AND B_1).

Evaluating two (or more) LSBs allows to distinguish four (or more) cross-lane overflow cases. Being able to identify overflows from the range {−2, −1, 0, 1}, the (potentially negative) sign of the product can be implicitly inferred for the purpose of monitoring. In fact, the designated lane width can be truncated before the sign bit of the result if this is needed to step up the operational density even further. It is a design trade-off to inspect even more of the LSBs to achieve a greater lane overlap at the cost of more expensive side-band logic.

At block 315, a downstream overflow monitor compares the expected value to an actual bit value in the multi result vector. That is, in this embodiment, the downstream overflow monitors receives the expected value from the overflow monitor that performed block 310 and receives at least the portion of the multi-result vector from the arithmetic unit that performs block 305. Although block 315 may be performed on a downstream overflow monitor (e.g., an overflow monitor in the next stage in the chain) this is for pipelining purposes and is not a requirement. In another embodiment, block 315 can be performed by the same overflow monitor that performed block 310 and generated the expected value.

At block 320, the downstream overflow monitor determines whether the expected value generated at block 310 matches the corresponding bits from the multi-result vector generated at block 305. If so, the method 300 proceeds to block 325 where the downstream overflow monitor determines that no overflow occurred between the results in the multi-result vector generated at block 305. In response, at block 330, the downstream overflow monitor stores the overflow value received from the previous stage without changes. That is, the downstream overflow monitor stores in its register the same overflow value that was received from the upstream overflow monitor.

However, if the expected value and the corresponding bits in the multi-result vector do not match, the method 300 proceeds to block 335 where the downstream overflow monitor detects an overflow between the results in the multi-result vector generated at block 305. For example, extended sign bits or a MSB bit in one of the results of the reduced-precision operations may overflow and impact one or more of the results of the other reduced-precision operations. In response, at block 340, the downstream overflow monitors updates the overflow value received from the previous stage and stores the updated overflow value in a register. In one embodiment, the downstream overflow monitor updates the overflow value so that the overflow value can be subtracted from the final multi-result vector to remove the impact caused by the overflow.

In this manner, each time there is an overflow, one of the overflow monitors detects the overflow and updates the overflow value accordingly. As such, at the end of the chain, the final overflow value can be used to remove the negative impact of the overflows from all the stages. Put differently, the overflow value outputted by the final stage can be used to correct the overflow that happened at all the previous stages when calculating the multi-result vector.

Figure 4:
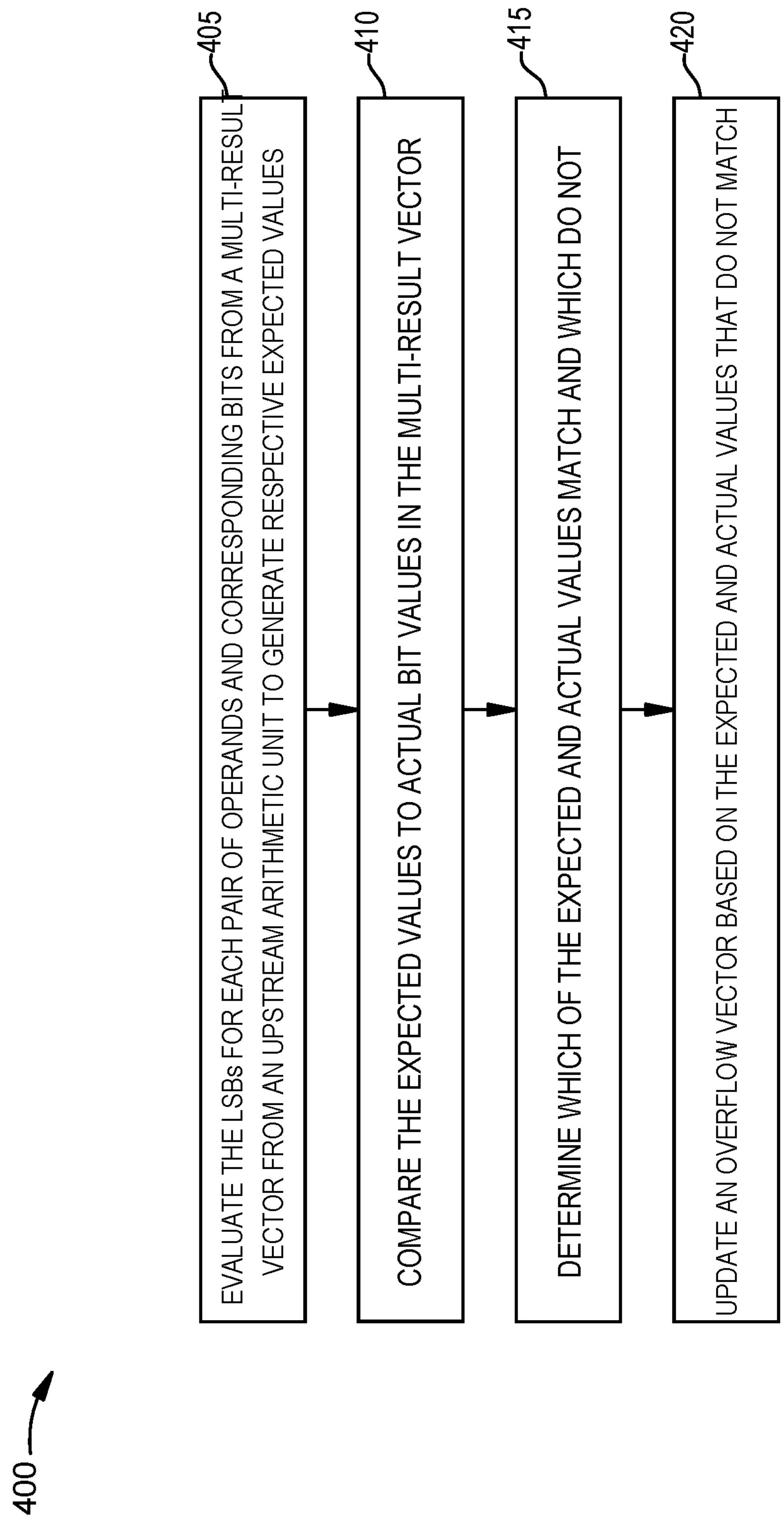
FIG. 4 is a flowchart for handling overflow in a multi-result vector, according to an example.

FIG. 4 is a flowchart of a method 400 for handling overflow in a multi-result vector, according to an example. In one embodiment, the overflow monitors may include pipelined logic for evaluating multiple pairs of operands. For example, when performing a MAC operation using the arithmetic units, the operands may include an "A Vector" which include multiple sub-operands—e.g., $a_1$, $a_2$, $a_3$, and $a_4$—which are each multiplied by a B operand. In this example, there are multiple pairs of operands being multiplied in the arithmetic unit—e.g., $a_1$*B, $a_2$*B, $a_3$*B, and $a_4$*B. As such, the overflow monitor may use the LSBs from each pair of these operands to generate respective expected values.

At block 405, an overflow monitor evaluates the LSBs for each pair of operands and corresponding bits from a multi-result vector from an upstream arithmetic unit to generate the respective expected values. In one embodiment, the overflow monitor generates as many expected values are there are pairs of operands. The logic for performing block 405 is illustrated and discussed in more detail in FIG. 5 below.

At block 410, a downstream overflow monitor receives the expected value from the overflow monitor performing block 405 and compares the expected values to actual bit values in the multi-result vector that is the same stage of the overflow monitor performing block 405.

At block 415, the downstream overflow monitor determines which of the expected and actual values match and which do not. For example, the expected values may be compared to different bits in the multi-result vector. As discussed in FIG. 1, depending on whether there is overflow (and if the value of those overflow bits are zero or one), there may be overflow between two adjacent results in the multi-result vector but not in others.

At block 420, the downstream overflow monitor updates an overflow value (in this case, an overflow vector) based on the expected and actual values that do not match. That is, the overflow value can include a vector of data which indicates where in the multi-result vector there was overflow. Thus, the vector of data in the overflow value can then be used to correct the final multi-result vector at the end of the chain or arithmetic units.

Figure 5:
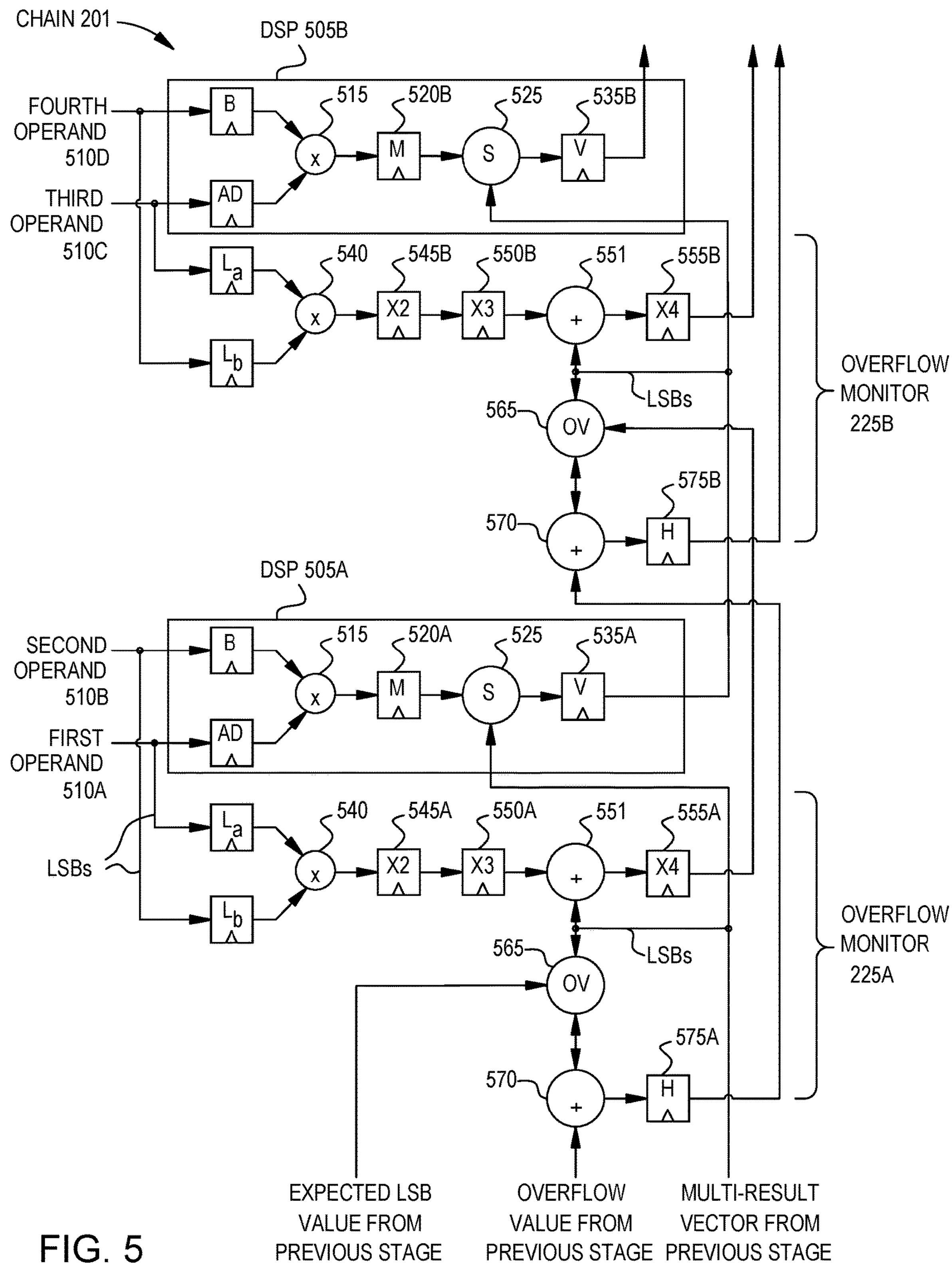
FIG. 5 illustrates a system that monitors the guard bits to prevent an overflow, according to an example.

FIG. 5 illustrates a chain 201 that monitors the guard bits to prevent an overflow, according to an example. The chain 201 includes DSPs 505 (which are one type of arithmetic unit) that each perform a multiply and accumulate operation (e.g., a MAC). Specifically, the DSP 505A multiples a first operand 510A with a second operand 510B by the multiply operation 515 the result of which is stored in the register 520A. Similarly, the DSP 505B multiples a third operand 510C with a fourth operand 510D by the multiply operation 515 the result of which is stored in the register 520B. The operands 510 can include multiple sub-operands which can use the DSPs 505 to perform parallel reduced-precision operations using the multiply operation 515. For example, the first and third operands 510A and 510C may be a vector or set of operands (e.g., sub-operands $a_1$, $a_2$, $a_3$, and $a_4$) that each are multiplied with the second and third operands 510B and 510D, respectively.

The result of the multiply operation 515 is stored in the register 520A and then sent to an accumulate operation 525 where the result is accumulated to a multi-result vector received from a previous DSP (not shown) in the chain 201. However, when performing the accumulate operation 525 (e.g., performing the summation illustrated in FIG. 1), the results of the pairs of operands may overflow with each other. Put differently, summing the results of multiplying the first and second operands 510A and 510B can cause overflow where the bits in one result affects or corrupts the bits in another result. In any case, the result of the accumulate operation 525 is a new multi-result vector which is stored in a register 535A. The value of this register (e.g., 48 bits) is then transmitted to the next DSP in the chain 201—i.e., the DSP 505B.

To detect overflow from performing the multiply and accumulate operations 515 and 525 in the DSP 505A, the LSBs of the first and second operands 510A and 510B are transmitted to respective registers in the overflow monitor 225. As mentioned in FIG. 2, the overflow monitors 225 can be implemented in side-band logic which may be separate from the DSPs 505. For example, the overflow monitors 225 may be implemented using programmable logic (e.g., configurable blocks) while the DSPs 505 are implemented using hardened circuitry.

The overflow monitor 225A performs an AND operation 540 on the LSBs and stores the result in a register 545A and then in register 550A. The results stored in the register 550A are then XOR'd using an XOR operation 555 with corresponding LSBs from the multi-result vector from the previous stage. The AND operation 540 and the XOR operation 555 is one example of performing block 310 in method 300 and block 405 in method 400. These operations can also be represented by the following equation:

$$0_{s_i} \oplus (0_b \wedge 0_{a_i}) \quad (1)$$

In Equation 1, $0_{s_i}$ represents the LSBs of the multi-result vector received from the previous stage, $0_b$ represents LSBs of the second operand, and $0_{a_i}$ represents each sub-operand in a vector of i number. That is the first operand 510A can include i number of sub-operands. The result of Equation 1 (and the output of the XOR operation 551) is stored in a register 555A. In one embodiment, the operation 540, the registers 535A, 550B, the operation 551 and the register 555A are parallelized so that expected values for each pair of operands can be calculated in parallel. That is, if the DSP 505A performs four reduced-precision operations in parallel, the overflow monitor 225 can be configured with four parallel data paths to calculate expected values for each of those operations which are stored in the register 555A. One advantage of using programmable logic is if the DSP 505A is later used to perform two or either reduced-precision parallel operations, the programmable logic forming the overflow monitor 225 can be reconfigured to handle the change in the number of expected values that are calculated and then stored in the register 555A.

In addition to calculating expected values for the reduced-precision operations performed by the DSP 505A, the overflow monitor 225A also updates the overflow value for the multi-result vector outputted by the previous stage. That is, the LSBs of the multi-result vector generated by the DSP in the previous stage along with the expected value (or values) calculated by the overflow monitor in the previous stage are inputted into an overflow operation 565 which outputs an overflow update value that is then added to the overflow value from the previous stage by the addition operation 570. If there is no overflow, then the output of the overflow operation 565 is zero. Thus, the same overflow value that was received from the previous stage is stored in a register 575A. However, if the output of the overflow operation 565 is a non-zero (i.e., there was overflow between one or more of the results in the multi-result vector received from the previous stage), the non-zero value is added to the overflow value and an updated overflow value (e.g., an overflow vector) is stored in the register 575A. The overflow monitor 225A then forwards the new overflow value stored in the register 575A and the expected value (or values) stored in the register 555A to the downstream overflow monitor 225B.

The overflow monitor 225B includes the same logic as the overflow monitor 225A. The overflow monitor 225 uses the AND operation 540, registers 545B and 550B, and the XOR operation 551 to calculate expected values using the LSBs of the third and fourth operands 510C and 510D and the LSBs of the multi-result vector output by the register 535A in the DSP 505A. These expected values can then be transmitted to the next stage in the chain 201 (not shown) to determine whether there was an overflow in the multi-result vector calculated by the DSP 505B.

In addition, the overflow monitor 225B uses the expected values received from the overflow monitor 225A to detect whether there was overflow in the multi-result vector calculated by the DSP 505A. That is, the overflow operation 565 in the monitor 225B compares the LSBs of the multi-result vector received from the register 535A to the expected values received from the register 555A to determine whether they match. If so, the overflow operation 565 outputs a zero vector which, when added to the overflow value received from the register 575A, results in the same value. However, if the values do not match, the overflow operation 565 outputs a non-zero vector which when added to the overflow value calculated by the overflow monitor 225A results in an updated overflow monitor stored in a register 575B. Using the overflow monitors 225A and 225B to calculate the non-zero vector for updating the overflow value is represented by the following:

$$c_i = 0_{s_i}{}^{+} \oplus 0_{s_i} \oplus (0_b \wedge 0_{a_i}) \quad (2)$$

In Equation 2, $0_{s_i}{}^{+}$ represents the actual results (e.g., the LSBs from the multi-result vector generated by the DSP 505A) that are XOR'd with Equation 1 to result in the expected results (i.e., $0_{s_i} \oplus (0_b \wedge 0_{a_i})$). The result of Equation 2 is $c_i$ which represents the lane carry values (e.g., a non-zero vector) which can be used to update the overflow value received from the previous stage. In this manner, each overflow monitor 225 can update the overflow value to compensate for the overflow that may occur at each DSP 505 in the chain 201.

The DSP 505B includes the same logic as the DSP 505A. The DSP 505B performs the same MAC operation except using the third and fourth operands 510C and 510D. The accumulate operation 525 sums the results of performing the multiply operation 515 with the multi-result vector generated by the DSP 505A. The resulting multi-result vector is then stored in a register 535B before being forwarded to a next stage in the chain 201. Eventually, the last DSP 505 in the chain 201 calculates a final multi-result vector which is a result of performing the MAC operations on all the DSPs 505 in the chain 201. Any overflow in the multi-results vectors generated by the DSPs 505 in the chain 201 can be compensated for by updating the overflow value at each overflow monitor 225 in the chain 201.

Figure 6:
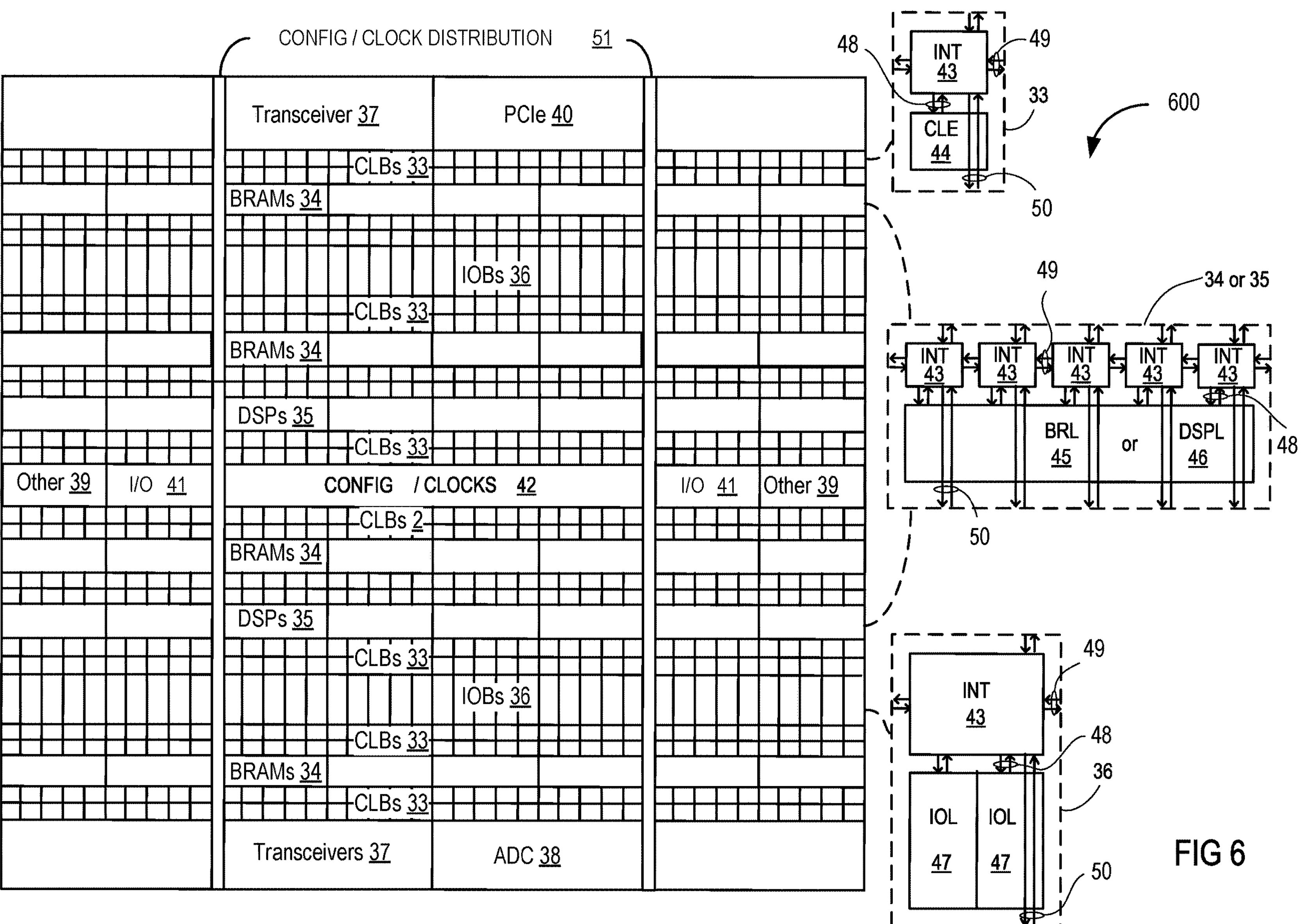
FIG. 6 illustrates a field programmable gate array implementation of a programmable IC according to an example.

FIG. 6 illustrates an FPGA implementation of the IC 200 that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 6. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. In one embodiment, the overflow monitors 225 (and the overflow corrector 250) in FIG. 2 can be implemented using one or more of the CLBs 33. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 6) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic.

Note that FIG. 6 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 6 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:

a chain of arithmetic units, wherein each arithmetic unit is configured to selectively perform either a single large operation or multiple reduced-precision operations in parallel, wherein the arithmetic units are configured to, when performing the multiple reduced-precision operations in parallel, generate multi-result vectors;

side-band logic configured to:

generate expected values associated with performing the multiple reduced-precision operations in a first arithmetic unit in the chain of arithmetic units based on operands inputted to the first arithmetic unit and a first multi-result vector previously generated by a second arithmetic unit upstream from the first arithmetic unit in the chain of arithmetic units, receive actual bit values of a second multi-result vector generated by the first arithmetic unit, and update an overflow value to indicate a first result in the second multi-result vector overflowed into a second result in the second multi-result vector when at least one of the expected values fails to match a corresponding one of the actual bit values; and an overflow corrector configured to correct the overflow between the first and second results based on the overflow value after a last arithmetic unit in the chain in the arithmetic units generates a final multi-result vector.

2. The integrated circuit of claim 1, wherein the side-band logic comprises a plurality of overflow monitors for calculating respective expected values and detecting overflow between results in multi-result vectors generated by a respective one of the arithmetic units.

3. The integrated circuit of claim 1, wherein the first arithmetic unit generates the second multi-result vector based on performing the multiple reduced-precision operations on the operands and accumulating results of performing the multiple reduced-precision operations with the first multi-result vector previously generated by the second arithmetic unit.

4. The integrated circuit of claim 1, wherein the first result is assigned a first portion in the second multi-result vector that directly abuts a second portion of the second multi-result vector assigned to the second result without guard bits between the first and second results.

5. The integrated circuit of claim 1, wherein the side-band logic is further configured to:

generate second expected values associated with performing the multiple reduced-precision operations in a third arithmetic unit in the chain of arithmetic units downstream from the first arithmetic unit based on operands inputted to the third arithmetic unit and the second multi-result vector previously generated by the first arithmetic unit;

receiving second actual bit values of a third multi-result vector generated by the third arithmetic unit; and updating, when at least one of the second expected values and a corresponding one of the second actual bit values fails to match, the overflow value to a new overflow value indicating both (i) the first result in the second multi-result vector overflowed into the second result in the second multi-result vector and (ii) a first result in the third multi-result vector overflowed into a second result in the third multi-result vector.

6. The integrated circuit of claim 1, wherein each of the arithmetic units includes an accumulate operation, wherein the accumulate operation is configured to receive a forwarded multi-result vector from a previous arithmetic unit in the chain, wherein an output of the accumulate operation is a multi-result vector for a current stage in the chain.

7. The integrated circuit of claim 1, wherein a mismatch between at least one of the expected values and a corresponding one of the actual bit values indicates that at least one of a sign bit and a most significant bit in a first portion of the second multi-result vector storing the first result of a first operation of the reduced-precision operations has corrupted a second portion of the second multi-result vector storing the second result of a second operation of the reduced-precision operations.

8. The integrated circuit of claim 1, wherein generating the expected value is based on only sub-portions of bits in the operands and the first multi-result vector, wherein the sub-portions comprise the least significant bits of the operands and the first multi-result vector.

9. The integrated circuit of claim 1, wherein the chain of arithmetic units is implemented using hardened circuitry and wherein the side-band logic is implemented using programmable logic, wherein the integrated circuit is a field-programmable gate array that includes both the hardened circuitry and the programmable logic.

10. The integrated circuit of claim 1, wherein the integrated circuit is an application specific integrated circuit (ASIC), wherein the chain of arithmetic units and the side-band logic are implemented using hardened circuitry.

11. A circuit, comprising:

a chain of arithmetic units, wherein each arithmetic unit is configured to perform multiple reduced-precision operations in parallel, wherein the arithmetic units are configured to, when performing the multiple reduced-precision operations in parallel, generate multi-result vectors;

side-band logic configured to:

generate expected values associated with performing the multiple reduced-precision operations in a first arithmetic unit in the chain of arithmetic units based on operands inputted to the first arithmetic unit and a first multi-result vector previously generated by a second arithmetic unit upstream from the first arithmetic unit in the chain of arithmetic units, receive actual bit values of a second multi-result vector generated by the first arithmetic unit, and update an overflow value to indicate a first result in the second multi-result vector overflowed into a second result in the second multi-result vector when at least one of the expected values fails to match a corresponding one of the actual bit values; and an overflow corrector configured to correct the overflow between the first and second results based on the overflow value after a last arithmetic unit in the chain in the arithmetic units generates a final multi-result vector.

12. The circuit of claim 11, wherein the first arithmetic unit generates the second multi-result vector based on performing the multiple reduced-precision operations on the operands and accumulating results of performing the multiple reduced-precision operations with the first multi-result vector previously generated by the second arithmetic unit.

13. The circuit of claim 11, wherein the first result is assigned a first portion in the second multi-result vector that directly abuts a second portion of the second multi-result vector assigned to the second result without guard bits between the first and second results.

14. The circuit of claim 11, wherein the side-band logic is further configured to:

generate second expected values associated with performing the multiple reduced-precision operations in a third arithmetic unit in the chain of arithmetic units downstream from the first arithmetic unit based on operands inputted to the third arithmetic unit and the second multi-result vector previously generated by the first arithmetic unit;

receiving second actual bit values of a third multi-result vector generated by the third arithmetic unit; and updating, when at least one of the second expected values and a corresponding one of the second actual bit values fails to match, the overflow value to a new overflow value indicating both (i) the first result in the second multi-result vector overflowed into the second result in the second multi-result vector and (ii) a first result in the third multi-result vector overflowed into a second result in the third multi-result vector.

15. A method, comprising:

performing multiple reduced-precision operations in parallel using a first arithmetic unit in a chain of arithmetic units to generate a first multi-result vector, wherein the arithmetic units are capable of performing both the multiple reduced-precision operations and a single large operation;

performing the multiple reduced-precision operations in parallel using a second arithmetic unit in the chain of arithmetic units to generate a second multi-result vector, wherein the second arithmetic unit is downstream from the first arithmetic unit;

generating expected values associated with performing the multiple reduced-precision operations in the second arithmetic unit based on operands inputted to the second arithmetic unit and the first multi-result vector;

receiving actual bit values of the second multi-result vector generated by the second arithmetic unit; and updating an overflow value to indicate a first result in the second multi-result vector overflowed into a second result in the second multi-result vector when at least one of the expected values fails to match a corresponding one of the actual bit values.

16. The method of claim 15, further comprising:

correcting the overflow between the first and second results based on the overflow value after a last arithmetic unit in the chain in the arithmetic units generates a final multi-result vector.

17. The method of claim 15, wherein generating the second multi-result vector comprises:

performing the multiple reduced-precision operations on the operands and accumulating results of performing the multiple reduced-precision operations with the first multi-result vector previously generated by the first arithmetic unit.

18. The method of claim 15, further comprises:

generating second expected values associated with performing the multiple reduced-precision operations in a third arithmetic unit in the chain of arithmetic units downstream from the second arithmetic unit based on operands inputted to the third arithmetic unit and the second multi-result vector previously generated by the second arithmetic unit;

identifying second actual bit values of a third multi-result vector generated by the third arithmetic unit; and updating, when at least one of the second expected values and a corresponding one of the second actual bit values fails to match, the overflow value to a new overflow value indicating both (i) the first result in the second multi-result vector overflowed into the second result in the second multi-result vector and (ii) a first result in the third multi-result vector overflowed into a second result in the third multi-result vector.

19. The method of claim 15, wherein generating the expected value is based on only sub-portions of the bits in the operands and the first multi-result vector, wherein the sub-portions comprise the least significant bits of the operands and the first multi-result vector.

20. The method of claim 19, further comprising:

identifying an overflow occurring between results in a third multi-result vector generated by a third arithmetic unit in the chain of arithmetic units that is upstream from the first and second arithmetic units, wherein, before updating the overflow value, the overflow value already stores an indication of the overflow in the third multi-result vector.

* * * * *